N-WAY ELECTRICAL POWER DIVIDER WHEREIN N IS AN ODD NUMBER

Original Filed Nov. 29, 1966 2 Sheets-Sheet 1

INVENTOR.
JOSEPH OLEKSIAK
BY
Kenway, Jenney & Hildreth
ATTORNEYS

N-WAY ELECTRICAL POWER DIVIDER WHEREIN N IS AN ODD NUMBER

Original Filed Nov. 29, 1966 2 Sheets-Sheet 2

INVENTOR
JOSEPH OLEKSIAK
BY
Kenway, Jenney & Hildreth
ATTORNEYS

United States Patent Office

Re. 27,299
Reissued Feb. 22, 1972

27,299

N-WAY ELECTRICAL POWER DIVIDER WHEREIN N IS AN ODD NUMBER

Joseph Oleksiak, Dudley, Mass., assignor to Adams-Russell Co., Inc., Waltham, Mass.

Original No. 3,428,920, dated Feb. 18, 1969, Ser. No. 597,650, Nov. 29, 1966. Application for reissue Mar. 10, 1970, Ser. No. 18,357

Int. Cl. H01p *5/12*

U.S. Cl. 333—8 9 Claims

Matter enclosed in heavy brackets [ ] appears in the original patent but forms no part of this reissue specification; matter printed in italics indicates the additions made by reissue.

ABSTRACT OF THE DISCLOSURE

An electrical network for summing or dividing high-frequency electrical power. Any odd number of high frequency electircal power inputs can be summed and the sum will appear at a single output port or, alternatively, a single high-frequency input can be divided into any odd number of output, each appearing at one of a plurality of ports. The network achieves a high degree of isolation between the plurality of ports as well as close coupling between the single port and each of the plurality of ports. These ends art attained by utilizing a plurality of transformers, each having two windings, the two windings consisting of a pair of insulated wires, each twisted about the other and the toroidally wound around of ferromagnetic core. The windings are connected to each other in such a way as to bring about net cancellations of electrical signals tending to transfer between the plurality of ports and net reinforcements of electrical signals tending to ransfer between each of the plurality of ports and a common terminal.

The present invention relates to improvements in circuitry for the distribution of high-frequency electrical power among plural transmission lines, and, in one particular aspect, to unique and improved broadband power dividers for the splitting of R.F. power between an odd number of output ports with a high degree of isolation between ports and with a minimum of loss.

It has of course been well known in the transmissions of high-frequency electrical energy to utilize various forms of electrical networks which will function in such diverse ways as to match couplings, divide power, mix, make balun conversions, and the like. In each instance, it is generally desirable that losses be low and that impedances be well matched over the frequency bands of interest; and, where a number of distribution lines are intercoupled, it is often required that certain of these be exceedingly well isolated from one another although efficiently coupled to yet another or others of the lines. Wherever possible,the need for adjustments is sought to be avoided, for evident reasons. The present teachings are specifically concerned with multi-port devices which will promote the aforementioned desirable characteristics to a significantly advanced extent, and which will nevertheless constitute an inexpensive and remarkably uncomplicated construction; in particular, exceptionally great isolation between an odd number of output or input ports is realized through a distinctive array of broadband transformer units cross-coupled to effect desired net power flows only in predetermined directions.

It is one of the objects of the present invention, therefore, to provide novel and improved radio-frequency networks of low-cost practical form wherein a plurality of intercoupled transmission lines are isolated by way of unique interacting transformer elements.

Another object is to provide broadband high-efficency power-dividing or summation circuitry of simple and compact construction which involves direct couplings through compensating isolation-transformer elements.

A further object is to provide a low-loss R.F. power-division network in which an odd plurality of output ports are efficiently isolated by uniquely-intercoupled transformers.

By way of a summary account of practice of this invention in one of its aspects, a miniature 3-way high-frequency power divider includes three toroid-core transformer units each separately having a primary and secondary winding, preferably of a special twisted-wire construction exhibiting a pronounced self-tuning as the consequence of certain distributed-capacitance characteristics. Unwanted interactions between the cores are suppressed by preserving them in a substantially tangetial relationship. Each of the three output ports is provided with a substantially direct electrical connection with a common input terminal through a different one of the three transformer primaries and, in addition, through a different one of the secondaries of a yet different one of the three transformers. Winding directions, and connections with the windings, are arranged to effect substantially complete cancellations of signals in the paths between any two of the output ports, while leaving net substantially identical electrical couplings for the transfer of signals between the input terminal and each of the output ports.

Although the features of this invention which are believed to be novel are set forth in the appended claims, specific details as to its practice in preferred embodiments, and the further objects and advantages thereof, may best be perceived through reference to the following description taken in connection with the accompanying drawings, wherein:

FIGURE 1 is a plan view of an improved miniature 3-way power-distribution device wherein low-loss and high-isolation characteristics are developed in accordance with the present invention;

FIGURE 2 portrays the same device from the side;

FIGURE 3 illustrates the device in an enlargement corresponding to the showing in FIGURE 1 with the top covering removed to expose internal construction features;

FIGURE 4 comprises a partial cross-section taken along section lines 4—4 in FIGURE 3, on a somewhat reduced scale;

Figure 1:
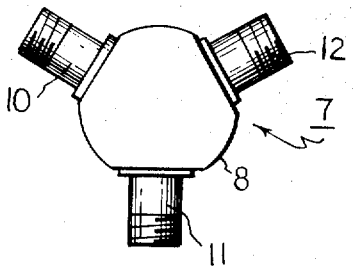
Figure 2:
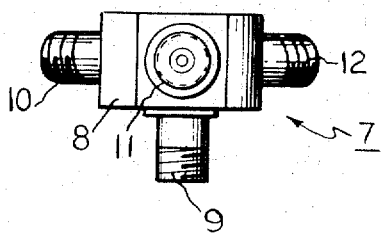
Figure 3:
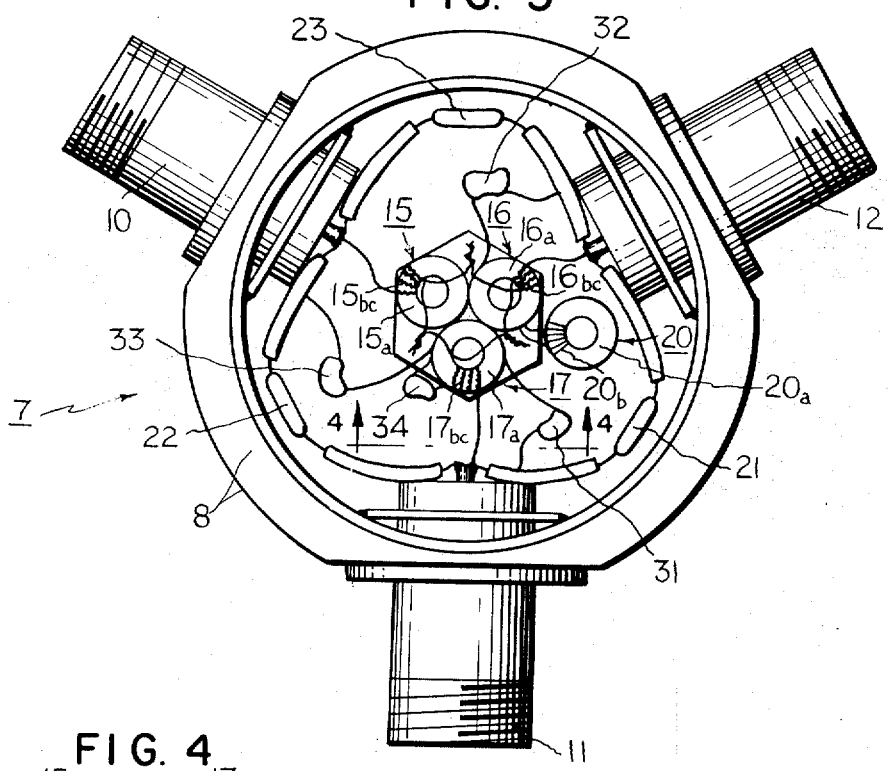
Figure 4:
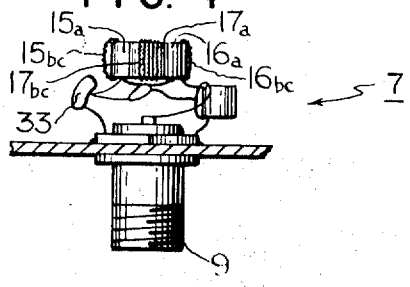

Equipment 7 in FIGURES 1–5 represents an advantageously compact, shielded, and convenient structural arrangement for a power summing or dividing network embodying these teachings. There, the components of the improved electrical network are contained within a small and rugged metallic housingand shield 8 which exhibits four cable connectors 9–12 as the only provisions for electrical access to the network. In its use as a power-splitter, the device 7 is supplied with an R.F. input via its lower central coaxial connector 9, and is intended to deliver substantially identical outputs of R.F. power through the three symmetrically-disposed coaxial cable connectors 10–12. Preferably, a substantially direct connection is desired between the input and output ports represented by these connectors; however, in practice, this technique has not been a feasible one for many applications because of the resultant cross-couplings between the output ports. In general, it is highly important that these ouput ports be well isolated from one another, while at the same time the coupling circuitry for them involves lower losses, broad bandwidth capabilities, and good VSWR characteristics. These objectives are met in device 7 largely through the use of three uniquely-coupled miniature transformer units 15–17, each of which comprises a conventional type of miniature toroid core, $15_a$–$17_a$, respectively, having appropriate magnetic characteristics for the high-frequency application. As shown, these cores are grouped in a substantially tangential compact coplanar cluster, with their central axes of symmetry parallel to one another, such that their respective magnetic fluxes will not interact materially. Each transformer core includes a pair of windings $15_{bc}$–$17_{bc}$, which, in the preferred construction, each comprise a twisted pair of the wirings $15_b$–$15_c$, $16_b$–$16_c$, and $17_b$–$17_c$, illustrated in FIGURE 5. The insulated wires, such as $15_b$ and $15_c$, are twisted about one another a predetermined number of times per inch, and the resulting twisted pair is then toroidally wrapped closely about one of the toroidal cores, such as core $15_a$, without overlapping, for a predetermined number of turns. Pairs $16_{bc}$ and $17_{bc}$ are similar. These twisted wires in each pair not only exhibit a desired inductive coupling but, also, a substantially uniform and highly stable distributed capacitance which renders the transformer unit self-tuned over a wanted range of frequencies. Desired port impedances are of course taken into account in constructing the transformer unit. In addition, an autotransformer 20, including a tapped winding $20_b$ on a toroidal core $20_a$, is employed to match the input port 9 with the network. This core is also disposed with its central longitudinal axis substantially parallel with those of the others, and in a laterally-spaced relationship which further minimizes unwanted core couplings.

Figure 5:
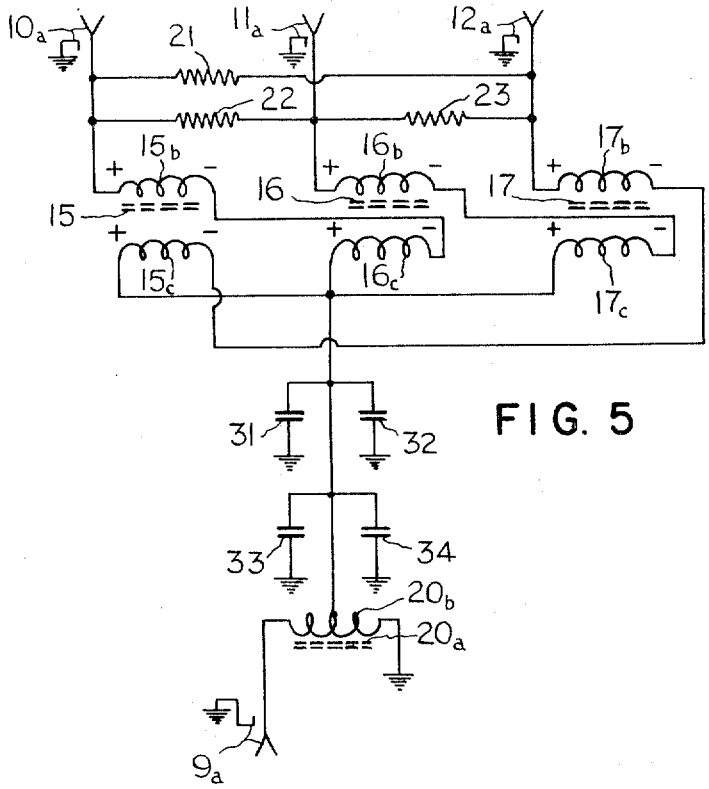
FIGURE 5 is a schematic representation of the 3-way network of FIGURES 1–4.

The special interconnections which effect the needed output-port isolations from each other while at the same time efficiently coupling them with the input port in a manner to share the applied R.F. power, appear most clearly in the schematic diagram of FIGURE 5. There, it may be noted that the center conductor of each of the output-port connectors, $10_a$–$12_a$, is separately connected with the center conductor of the input-port connector $9_a$, through the matching autotransformer winding $20_b$, by way of a different one of the three corresponding "primary" windings $15_c$–$17_c$. However, each of said windings $15_c$–$17_c$ also includes in series therewith a different one of the "secondary" windings, $15_b$–$17_b$, associated with a core and "primary" winding which are different from that under consideration. Moreover, as shown by the + and — instantaneous polarity markings for the windings, each "primary" is wound and connected to carry current such that each transformer unit tends to exhibit a "secondary" winding polarity which is [different from] *the same as* that of the "primary" on the same core. Thus, port $10_a$ is connected with input port $9_a$ by way of a series connection of "secondary" $15_b$ and "primary" $16_c$; and port $11_a$ is connected with the same input port $9_a$ via series-connected windings $16_b$ and $17_c$; and port $12_a$ is connected with the same input port $9_a$ via series-connected windings $17_b$ and $15_c$. Considering intended current flow to port $11_a$ from port $9_a$, for example, it is evident that this will result in induced signals in both windings $16_c$ and $17_b$, and that the latter two windings, also simultaneously carrying current to the output ports with which they are in circuit, will also induce signals in windings $15_c$ and $16_b$. In each instance, the net inductive effects are cumulative rather than offsetting, such that the desired power transfers take place between the input port $9_a$ and each of the output ports $10_a$–$12_a$. However, if currents should seek to circulate between any two of the output ports, the resulting effects are self-cancelling, and the ports are thus fully isolated. Considering, by way of example, the possibility of flow of current from port $11_a$ to port $12_a$, the net signals induced by such flow would be of equal and opposite character, thereby achieving cancellations, and the desired isolations. The same considerations apply in connection with each possibility of coupling between output ports. In an alternative use, with like beneficial results, the port $9_a$ will provide a summation of signals applied to ports $10_a$–$12_a$. A different pair of the three resistances 21–23 is connected between the center conductor of each port and that of each of the other two, as shown, to provide proper terminations; these resistances dissipate energy to take account of certain phase and amplitude differences. Capacitances 31–34 aid in providing desired impedance and tuning characteristics associated with the common port $9_a$ and its matching autotransformer.

Figure 6:
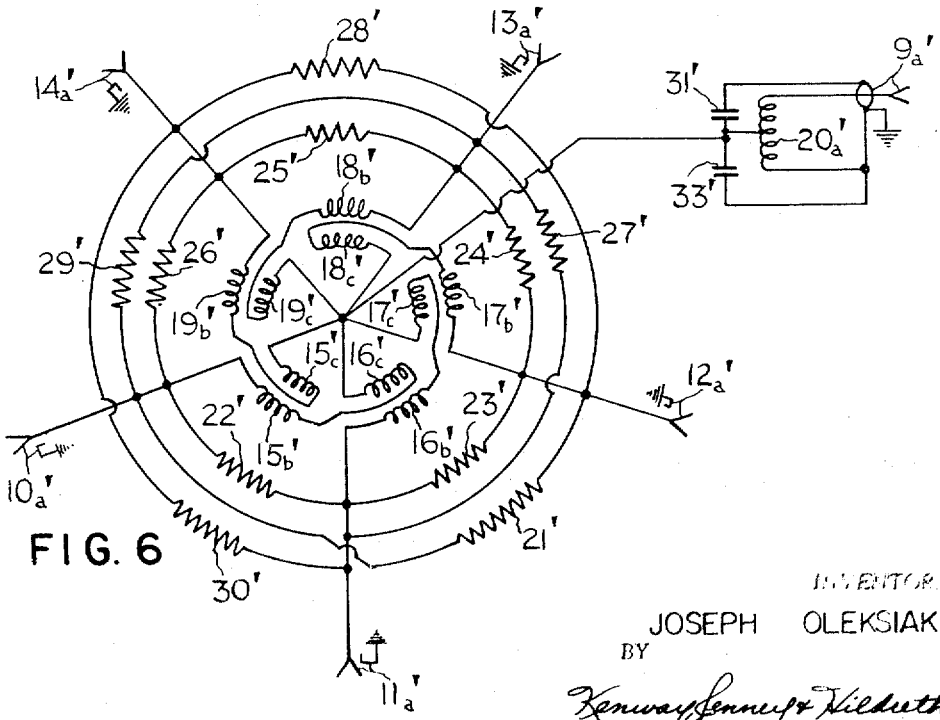
FIGURE 6 depicts in a circularly-arrayed schematic diagram the electrical circuitry of a similar 5-way network.

The schematic diagram appearing in FIGURE 6 illustrates an application of the same principles to another n-way device wherein the odd integer representing the number of output ports or plural input ports is five, rather than three. As an aid and convenience in the description and drawing, the functional counterparts of elements of the above-described embodiment are represented by the same reference characters, single-prime accents being employed to distinguish the components in FIGURE 6. In its use as a power divider, this device is supplied with R.F. input via port $9_{a'}$ having the matching transformer $20_{a'}$ and associated capacitances 31′ and 33′. Each of the transformer windings $15_{c'}$–$19_{c'}$ is connected in series with a different one of the windings $19_{b'}$, $15_{b'}$–$18_{b'}$, respectively, to complete a transformer ring wherein each successive transformer in the ring array has its "primary" in series with the "secondary" of the next-preceding transformer. The polarizations are as described in connection with the embodiment of FIGURES 1–5, such that tendencies toward undesirable current flows between any of the ports $10_{a'}$–$14_{a'}$ result in net cancellations of unwanted signals, yet the intended transfers of power occur with very low losses. Terminating impedances 21′–30′, shown as resistances, appear one between each of the ports $10_a$–$14_{a'}$ and each of the remaining ports in the same groups.

Those versed in the art will appreciate that the illustrated devices may be altered within the purview of these teachings. By way of example, other odd numbers of plural ports may be included, the transformer units may include other types of windings and cores, or may be coreless; and other matching, terminating tuning, and coupling elements may be employed. Accordingly, it should be understood that the specific embodiments disclosed are intended to be of a descriptive rather than a limiting character, and that various modifications, combinations and substitutions may be effected in practice of this invention without departure either in spirit or scope from its broader aspects.

What I claim as new and desire to secure by Letters Patent of the United States is:

1. High-frequency electrical power distribution apparatus comprising a plurality of connection ports constituting an odd number forming a first set of ports, an equal plurality of transformers each of said transformers including first and second electromagnetically-coupled windings wound on a ferromagnetic core, the ends of each of said windings having a polarity associated therewith, the ends of each individual winding being of opposite polarity, means connecting one end of the first winding of each of said transformers to one end of [opposite] *like* polarity of the second winding of another of said transformers, means connecting each of said first set of connection ports to a respective one of the unconnected ends of each series-connected pair of said windings, said unconnected ends being of the same polarity, means connecting each other unconnected end of each series-connected pair of windings to a common terminal, and means electrically coupling said common terminal to an additional connection port, said additional port not being included in said first set of ports.

2. High-frequency electrical power distribution apparatus as set forth in claim 1 wherein each of said transformers is substantially identical with the others and includes as the two windings thereof a pair of insulated wires each twisted about the other to provide both electromagnetic coupling and a predetermined distributed capacitance therebetween.

3. High-frequency electrical power distribution apparatus as set forth in claim 1 wherein said plurality of transformers constitute a ring array wherein said connecting means connect one end of one of the windings of each of said transformers to one end of [opposite] *like* polarity of a different one of the windlings of the next-succeeding transformer about the ring array.

4. High-frequency electrical power distribution apparatus as set forth in claim 1 further comprising a plurality of impedances and means connecting said impedances in circuit relationships with said plurality of connection ports wherein each of the ports is connected with each of the others of the ports by way of a separate one of said impedances.

5. High-frequency electrical power distribution apparatus as set forth in claim 4 wherein each of said impedances comprises a resistance of substantially the same value as each of the other resistances, and wherein each of said transformers is substantially identical with the others.

6. High-frequency electrical power distribution apparatus as set forth in claim 1 wherein each of said transformers comprises an annular magnetic core, and wherein the windings of each of said transformers are wrapped toroidally around a different one of the annular cores, and means maintaining said cores in a substantially tangential and coplanar relationship to one another with their axes of circular symmetry substantially parallel and in laterally-spaced relationship.

7. High-frequency electrical power distribution apparatus as set forth in claim 6 wherein each of said transformers has a transformation ratio which is substantially unity, and wherein the two windings of each of said transformers comprise a pair of insulated wires each twisted about the other and together wrapped toroidally about a different one of said annular cores to provide both electromagnetic coupling and a predetermined distributed capacitance therebetween.

8. High-frequency electrical power distribution apparatus as set forth in claim 6 further comprising impedance-matching means including an autotransformer connecting said additional connection port with said common terminal, said autotransformer having winding means about an annular magnetic core, and means maintaining the axis of circular symmetry of said core in a spaced parallel relation to said axes of said cores.

9. High-frequency electrical power distribution apparatus as set forth in claim 7 including a housing of electrically-conductive material grounded as reference, and wherein each of said connection ports comprises a coaxial cable connector having the outer conductor thereof electrically grounded and mechanically connected with said housing, and wherein said electrical connecting and coupling means couple the inner conductor of each of said ports with the electrical network formed by said transformers.

References Cited

The following references, cited by the Examiner, are of record in the patented file of this patent or the original patent.

UNITED STATES PATENTS

| | | | |
|---|---|---|---|
| 1,781,308 | 11/1930 | Vos | 333—11 X |
| 2,776,408 | 1/1957 | Tongue | 333—8 |
| 2,870,397 | 1/1959 | Kelley | 336—215 X |
| 3,192,490 | 6/1965 | Petts et al. | 333—11 |
| 3,305,800 | 2/1967 | Velsink | 333—8 X |
| 3,310,759 | 3/1967 | Ogasawara | 333—1.1 |

HERMAN KARL SAALBACH, Primary Examiner

P. L. GENSLER, Assistant Examiner

U.S. Cl. X.R.

333—6; 336—170, 182, 212